(12) United States Patent
Sakhnini et al.

(10) Patent No.: US 11,564,221 B2
(45) Date of Patent: Jan. 24, 2023

(54) CORESET0 CONFIGURATION AND/OR SS0 CONFIGURATION FOR REDUCED CAPABILITY UES

(71) Applicant: QUALCOMM Incorporated, San Diego, CA (US)

(72) Inventors: Iyab Issam Sakhnini, San Diego, CA (US); Tao Luo, San Diego, CA (US); Wooseok Nam, San Diego, CA (US); Juan Montojo, San Diego, CA (US); Peter Gaal, San Diego, CA (US); Peter Pui Lok Ang, San Diego, CA (US); Huilin Xu, San Diego, CA (US); Jelena Damnjanovic, Del Mar, CA (US); Olufunmilola Omolade Awoniyi-Oteri, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 118 days.

(21) Appl. No.: 17/248,261

(22) Filed: Jan. 15, 2021

(65) Prior Publication Data

US 2021/0250929 A1     Aug. 12, 2021

Related U.S. Application Data

(60) Provisional application No. 62/975,366, filed on Feb. 12, 2020.

(51) Int. Cl.
*H04W 72/04*     (2009.01)

(52) U.S. Cl.
CPC ....... *H04W 72/042* (2013.01); *H04W 72/048* (2013.01)

(58) Field of Classification Search
CPC .... H04L 5/0053; H04L 5/0091; H04W 48/12; H04W 72/042; H04W 72/048
See application file for complete search history.

(56) References Cited

U.S. PATENT DOCUMENTS 10,448,388 B2 * 10/2019 Hwang .................. H04L 5/001
10,492,157 B2 * 11/2019 Nam ..................... H04L 5/0044
11,026,199 B2 * 6/2021 Nam ..................... H04L 5/0092
(Continued)

FOREIGN PATENT DOCUMENTS

CN    110505642 A  * 11/2019 ............ H04W 24/02
CN    110168972 B  *  4/2021 ............... A01J 5/12
(Continued)

OTHER PUBLICATIONS

English Translation of the Description of WO2021146998A1, Retrieved From Espacenet (Year: 2022).*

*Primary Examiner* — Eric Nowlin
(74) *Attorney, Agent, or Firm* — Harrity & Harrity, LLP (57) ABSTRACT

Various aspects of the present disclosure generally relate to wireless communication. In some aspects, a user equipment (UE) may identify at least one of a control resource set zero (CORESET0) field or a search space zero (SS0) field in a master information block (MIB). The UE may identify, based at least in part on whether the UE is a reduced capability UE, at least one of: a CORESET0 configuration associated with a first value indicated in the CORESET0 field, or an SS0 configuration associated with a second value indicated in the SS0 field. Numerous other aspects are provided.

30 Claims, 5 Drawing Sheets

(56) References Cited

U.S. PATENT DOCUMENTS

| | | | |
|---|---|---|---|
| 11,277,737 B2* | 3/2022 | Xu | H04W 72/042 |
| 11,375,552 B2* | 6/2022 | Lei | H04W 76/27 |
| 2018/0192383 A1* | 7/2018 | Nam | H04W 56/001 |
| 2019/0215807 A1* | 7/2019 | Hwang | H04L 5/001 |
| 2020/0045658 A1* | 2/2020 | Nam | H04J 11/0073 |
| 2020/0187171 A1* | 6/2020 | Hwang | H04L 5/003 |
| 2020/0228966 A1* | 7/2020 | Xu | H04W 72/042 |
| 2021/0127283 A1* | 4/2021 | Si | H04W 24/08 |
| 2021/0266970 A1* | 8/2021 | Lei | H04L 1/1812 |
| 2021/0382978 A1* | 12/2021 | Jeon | G06F 21/31 |
| 2021/0400706 A1* | 12/2021 | Aiba | H04W 72/1263 |
| 2022/0015019 A1* | 1/2022 | Park | H04W 72/0453 |
| 2022/0104109 A1* | 3/2022 | Lei | H04W 72/048 |
| 2022/0150820 A1* | 5/2022 | Newman | H04W 60/04 |
| 2022/0159618 A1* | 5/2022 | Parkvall | H04L 1/0061 |
| 2022/0159693 A1* | 5/2022 | Zhou | H04W 72/0446 |
| 2022/0191895 A1* | 6/2022 | Oh | H04W 72/1289 |

FOREIGN PATENT DOCUMENTS

| | | | | |
|---|---|---|---|---|
| CN | 113273119 A | * | 8/2021 | H04L 5/0053 |
| CN | 113508613 A | * | 10/2021 | H04W 24/08 |
| CN | 113994618 A | * | 1/2022 | H04L 5/0053 |
| CN | 110505642 B | * | 2/2022 | H04W 24/02 |
| CN | 114208322 A | * | 3/2022 | H04L 5/0048 |
| DE | 102021112311 A1 | * | 11/2021 | |
| EP | 3753183 A1 | * | 12/2020 | H04L 5/0053 |
| EP | 3790218 A1 | * | 3/2021 | H04J 11/00 |
| TW | 202127942 A | * | 7/2021 | H04W 74/006 |
| WO | WO-2019160498 A1 | * | 8/2019 | H04L 5/0053 |
| WO | WO-2020145320 A1 | * | 7/2020 | H04L 1/0061 |
| WO | WO-2020258216 A1 | * | 12/2020 | H04L 5/0053 |
| WO | WO-2021080389 A1 | * | 4/2021 | H04W 24/08 |
| WO | WO-2021112740 A1 | * | 6/2021 | H04W 74/006 |
| WO | WO-2021146998 A1 | * | 7/2021 | |
| WO | WO-2021201756 A1 | * | 10/2021 | |
| WO | WO-2021201757 A1 | * | 10/2021 | |
| WO | WO-2021229329 A1 | * | 11/2021 | |

* cited by examiner

CORESET0 CONFIGURATION AND/OR SS0 CONFIGURATION FOR REDUCED CAPABILITY UES

CROSS-REFERENCE TO RELATED APPLICATION

This patent application claims priority to U.S. Provisional Patent Application No. 62/975,366, filed on Feb. 12, 2020, entitled "CORESET0 CONFIGURATION AND/OR SS0 CONFIGURATION FOR REDUCED CAPABILITY UES," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for indicating a control resource set zero configuration and/or a search space zero configuration for reduced capability user equipments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying at least one of a control resource set zero (CORESET0) field or a search space zero (SS0) field in a master information block (MIB); and identifying, based at least in part on whether the UE is a reduced capability UE, at least one of a CORESET0 configuration associated with a first value indicated in the CORESET0 field, or an SS0 configuration associated with a second value indicated in the SS0 field.

In some aspects, a UE for wireless communication may include a memory and one or more processors operatively coupled to the memory. The memory and the one or more processors may be configured to identify at least one of a CORESET0 field or an SS0 field in a MIB; and identify, based at least in part on whether the UE is a reduced capability UE, at least one of a CORESET0 configuration associated with a first value indicated in the CORESET0 field, or an SS0 configuration associated with a second value indicated in the SS0 field.

In some aspects, a non-transitory computer-readable medium may store one or more instructions for wireless communication. The one or more instructions, when executed by one or more processors of a UE, may cause the UE to identify at least one of a CORESET0 field or an SS0 field in a MIB; and identify, based at least in part on whether the UE is a reduced capability UE, at least one of a CORESET0 configuration associated with a first value indicated in the CORESET0 field, or an SS0 configuration associated with a second value indicated in the SS0 field.

In some aspects, an apparatus for wireless communication may include means for identifying at least one of a CORESET0 field or an SS0 field in a MIB; and means for identifying, based at least in part on whether the apparatus is a reduced capability UE, at least one of a CORESET0 configuration associated with a first value indicated in the CORESET0 field, or an SS0 configuration associated with a second value indicated in the SS0 field.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
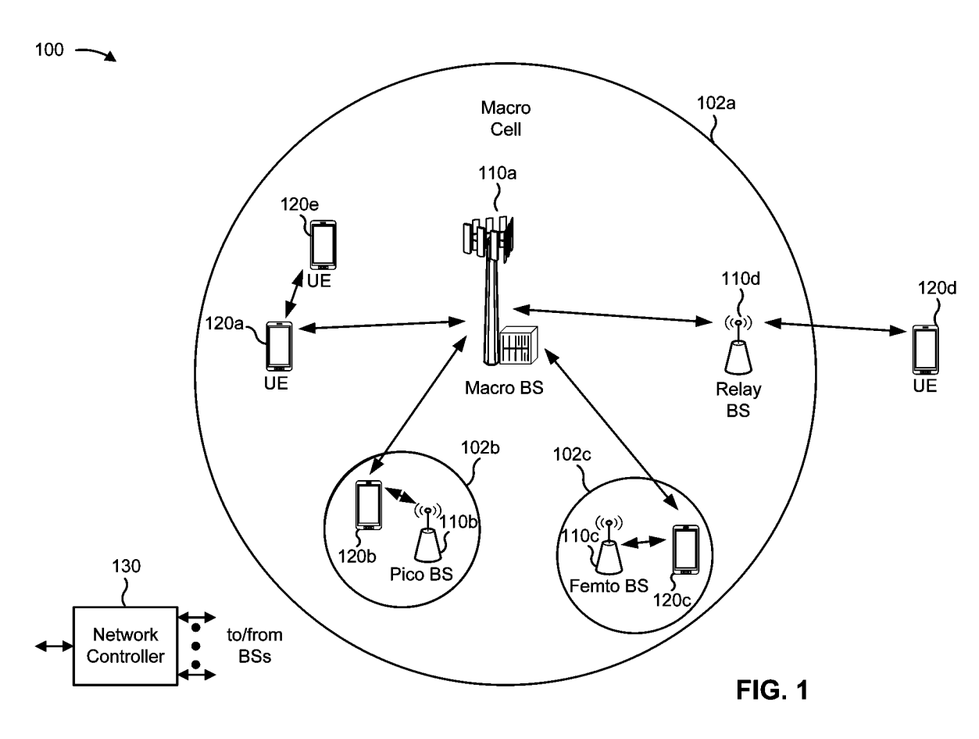
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
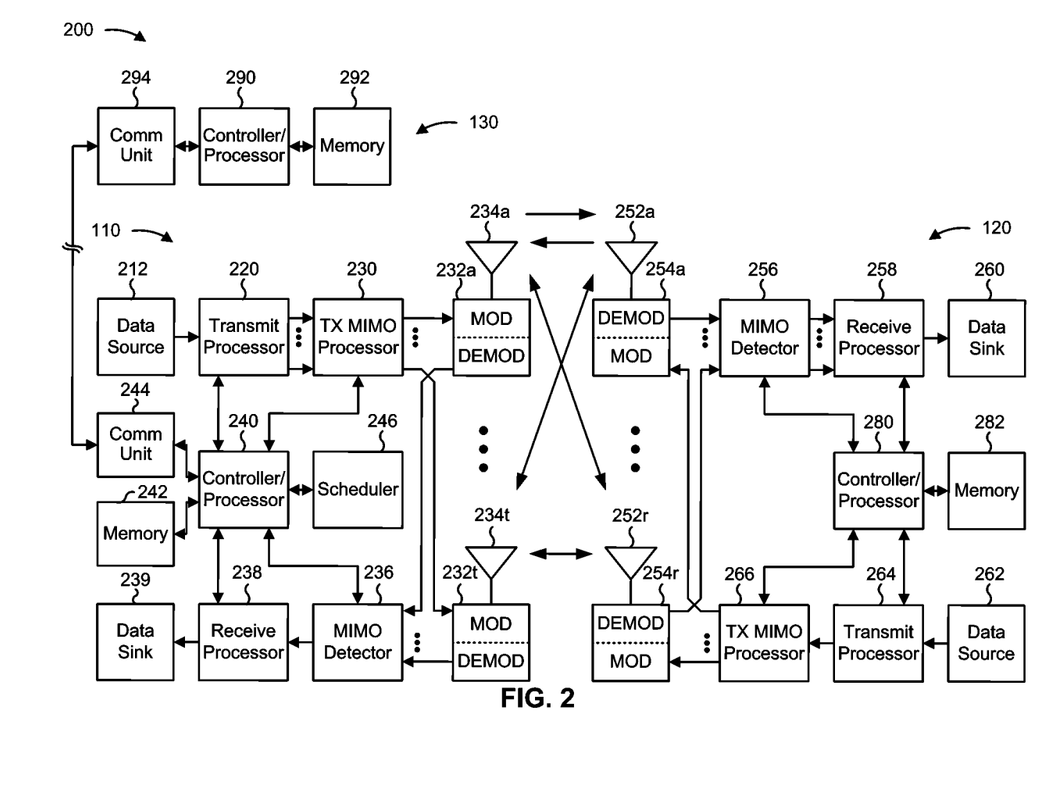
FIG. 2 is a diagram illustrating an example of a base station in communication with a user equipment (UE) in a wireless communication network, in accordance with various aspects of the present disclosure.

FIG. 2 is a diagram illustrating a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP) parameter, received signal strength indicator (RSSI) parameter, reference signal received quality (RSRQ) parameter, channel quality indicator (CQI) parameter, or a combination thereof, among other examples. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. In some aspects, a modulator and a demodulator (e.g., MOD/DEMOD 254) of the UE 120 may be included in a modem of the UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

Controller/processor 240 of base station 110, controller/processor 280 of UE 120, and/or any other component(s) of FIG. 2 may perform one or more techniques associated with indicating a control resource set zero (CORESET0) configuration and/or a search space zero (SS0) configuration for reduced capability UEs, as described in more detail elsewhere herein. For example, controller/processor 240 of base station 110, controller/processor 280 of UE 120, and/or any other component(s) of FIG. 2 may perform or direct operations of, for example, process 400 of FIG. 4 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 400 of FIG. 4 and/or other processes as described herein. A scheduler 246 may schedule UEs for data transmission on the downlink and/or uplink. In some aspects, a modulator and a demodulator (e.g., MOD/DEMOD 232) of the base station 110 may be included in a modem of the base station 110.

In some aspects, UE 120 may include means for identifying at least one of a CORESET0 field or a SS0 field in a master information block (MIB), means for identifying, based at least in part on whether the UE 120 is a reduced capability UE, at least one of a CORESET0 configuration associated with a first value indicated in the CORESET0 field or an SS0 configuration associated with a second value indicated in the SS0 field, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

A BS may broadcast or multicast one or more synchronization signal blocks (SSBs) to UEs in a wireless network. The one or more SSBs may each include a primary synchronization signal (PSS), a secondary synchronization signal (SSS), and a physical broadcast channel (PBCH). The PSS and SSS may be used by the UEs for cell search and acquisition. For example, the PSS may be used by the UEs to determine symbol timing, and the SSS may be used by the UEs to determine a physical cell identifier, associated with the base station, and frame timing.

The PBCH may carry a MIB, which may include system information for initial access. A UE may read the system information in the MIB to identify a CORESET0 and an SS0, which may respectively include a set of frequency domain resources and a set of time domain resources in which the UE may monitor for a downlink control information (DCI) communication on a physical downlink shared channel (PDCCH). The DCI may include a scheduling grant for a system information block (SIB) associated with the BS (e.g., SIB1). The UE may read the SIB1 to gain additional system information associated with the wireless network, such as a public land mobile network (PLMN) identifier, a tracking area code, a cell identity, additional SIBs (e.g., SIB2, SIB3, and so on), and/or the like.

In some cases, a UE may be a reduced capability UE, an NR-light UE, or another type of device having reduced or lower capabilities relative to other UEs. For example, a reduced capability UE may be equipped with fewer transmit and/or receive antennas, may be equipped with a lower-capability battery, may be equipped with fewer processing and/or memory resources (which may result in longer processing timelines), may only be capable of monitoring and/or processing a reduced frequency bandwidth, may only be capable of half-duplex frequency division duplexing, and/or the like. In some cases, a reduced capability UE may have reduced capabilities due to a small form factor, due to keeping the cost of the reduced capability UE low, and/or the like. Examples of reduced capability UEs may include IoT devices, biometric sensors/devices, smart watches, smart clothing, smart glasses, smart wrist bands, smart jewelry, vehicular components or sensors (e.g., cellular-enabled onboard diagnostic (OBD) devices), smart meters/sensors, and/or the like.

In some cases, a reduced capability UE may need to be configured with different SIBs relative to non-reduced capability UEs. As a result, a BS may transmit a different SIB1 to indicate these SIBs to reduced capability UEs. Moreover, because reduced capability UEs may only be capable of monitoring and/or processing a reduced frequency bandwidth, a different (reduced bandwidth) CORESET0 and/or a different SS0 may need to be configured for reduced capability UEs. Thus, a BS may need to transmit additional and/or larger SSBs to broadcast or multicast different MIBs for reduced capability UEs and non-reduced capability UEs, which increases the amount of radio resources consumed by signaling system information in the wireless network.

Some aspects described herein provide techniques and apparatuses for indicating a CORESET0 configuration and/or an SS0 configuration for reduced capability UEs. In some aspects, a BS may transmit a MIB, which may include a CORESET0 field and/or an SS0 field. The CORESET0 field may include one or more bits that indicate a first value, and the SS0 field may include one or more bits that indicate a second value. The first value and the second value may each be interpreted differently by different types of UEs to indicate different CORESET0 configurations and different SS0 configurations for the different types of UEs.

For example, a non-reduced capability UE may identify a CORESET0 configuration for non-reduced capability UEs by performing a lookup in a CORESET0 configuration table (or another type of electronic data structure) for non-reduced capability UEs based at least in part on the first value, whereas a reduced capability UE may identify a CORESET0 configuration for reduced capability UEs by performing a lookup in a CORESET0 configuration table (or another type of electronic data structure) for reduced capability UEs based at least in part on the first value. As another example, a non-reduced capability UE may identify an SS0 configuration for non-reduced capability UEs by performing a lookup in an SS0 configuration table (or another type of electronic data structure) for non-reduced capability UEs based at least in part on the second value, whereas a reduced capability UE may identify an SS0 configuration for reduced capability UEs by performing a lookup in an SS0 configuration table (or another type of electronic data structure) for reduced capability UEs based at least in part on the second value.

In this way, a single CORESET0 field of a MIB may point to a plurality of CORESET0 configurations, and a single SS0 field of the MIB may point to a plurality of SS0 configurations. This permits a single CORESET0 field and a single SS0 field to identify different CORESET0 configurations and different SS0 configurations for reduced capability UEs, non-reduced capability UEs, and/or other types of UEs. This conserves radio resources that would have otherwise been consumed based on transmitting additional and/or larger SSBs to broadcast or multicast different MIBs for reduced capability UEs and non-reduced capability UEs.

Figure 3A:
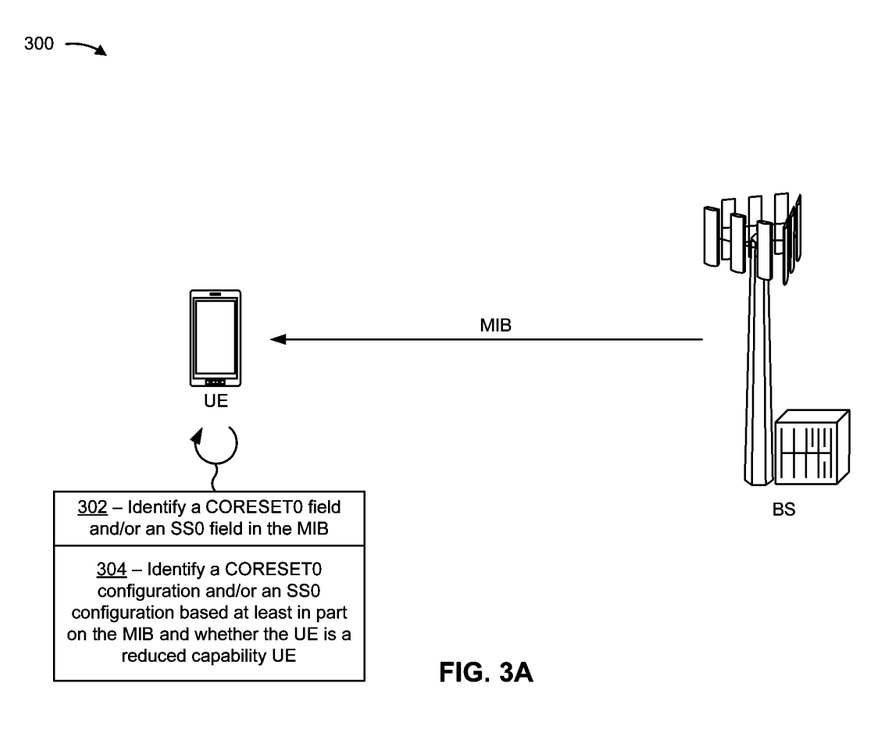
FIGS. 3A and 3B are diagrams illustrating one or more examples of indicating a control resource set zero configuration and/or a search space zero configuration for reduced capability UEs, in accordance with various aspects of the present disclosure.
Figure 3B:
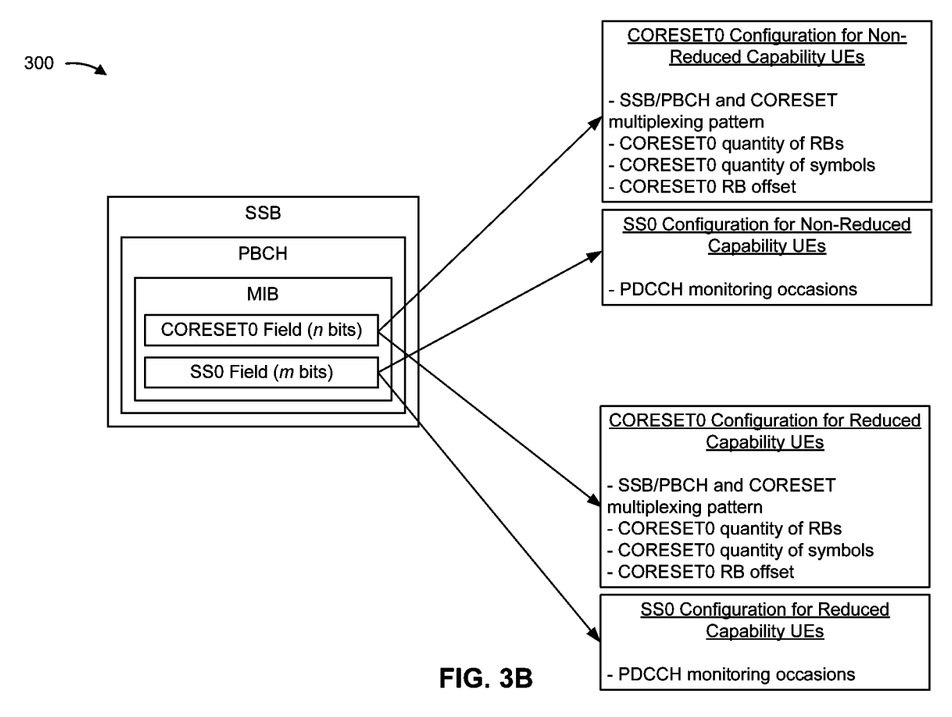

FIGS. 3A and 3B are diagrams illustrating one or more examples 300 of indicating a CORESET0 configuration and/or an SS0 configuration for reduced capability UEs, in accordance with various aspects of the present disclosure. As shown in FIGS. 3A and 3B, example(s) 300 may include communication between a UE (e.g., a UE 120) and a BS (e.g., a BS 110). In some aspects, the UE and the BS may be included in a wireless network, such as wireless network 100. In some aspects, the UE and the BS may communicate via a wireless access link, which may include an uplink and a downlink.

As shown in FIG. 3A, the BS may transmit a MIB. The MIB may be included in an SSB, which may be broadcasted or multicasted to the UE and other UEs in the wireless network. As shown by reference number 302, the UE may receive the MIB and may identify a CORESET0 field and/or an SS0 field in the MIB. The UE may identify a first value indicated in the CORESET0 field and/or a second value indicated in the SS0 field.

As further shown in FIG. 3A, and by reference number 304, the UE may identify a CORESET0 configuration and/or an SS0 configuration based at least in part on the MIB. For example, the UE may identify a CORESET0 configuration associated with the first value indicated in the CORESET0 field and/or may identify an SS0 configuration associated with the second value indicated in the SS0 field.

In some aspects, the UE may identify the CORESET0 configuration and/or the SS0 configuration based at least in part on whether the UE is a reduced capability UE. In some aspects, the UE may be configured with information and/or programming (e.g., a UE capability and/or other types of parameters) that indicates to the UE that the UE is a reduced capability UE. In some aspects, the UE may interpret the first value in the CORESET0 field and/or the second value in the SS0 field differently based at least in part on whether the UE is a reduced capability UE.

For example, if the UE is a non-reduced capability UE, the UE may identify a CORESET0 configuration for non-reduced capability UEs by performing a lookup in a CORESET0 configuration table (or a database, an electronic file, or another type of electronic data structure) for non-reduced capability UEs based at least in part on the first value and/or may identify an SS0 configuration for non-reduced capability UEs by performing a lookup in an SS0 configuration table (or a database, an electronic file, or another type of electronic data structure) for non-reduced capability UEs based at least in part on the second value.

As another example, if the UE is a reduced capability UE, the UE may identify a CORESET0 configuration for reduced capability UEs by performing a lookup in a CORESET0 configuration table (or a database, an electronic file, or another type of electronic data structure) for reduced capability UEs based at least in part on the first value and/or may identify an SS0 configuration for reduced capability UEs by performing a lookup in an SS0 configuration table (or a database, an electronic file, or another type of electronic data structure) for reduced capability UEs based at least in part on the second value.

In some aspects, the UE may monitor a CORESET0 and/or an SS0 based at least in part on identifying the CORESET0 configuration and/or the SS0 configuration. In some aspects, the UE may monitor one or more time domain resources (e.g., symbols, slots, and/or the like) indicated by the SS0 configuration and/or one or more frequency domain resources (e.g., resource elements, resource blocks, subcarriers, and/or the like) indicated by the CORESET0 configuration for DCI communications transmitted from the BS. The UE may receive a DCI communication in the time domain resources and/or frequency domain resources on a PDCCH, and may identify a SIB1 transmitted from the BS based at least in part on the DCI communication.

FIG. 3B illustrates an example of a MIB pointing to different CORESET0 configurations and different SS0 configurations for non-reduced capability UEs and reduced capability UEs. As shown in FIG. 3B, a first value indicated by n bits in a CORESET0 field of the MIB may point to a CORESET0 configuration for non-reduced capability UEs and to a CORESET0 configuration for reduced capability UEs. As shown in FIG. 3B, a second value indicated by m bits in an SS0 field of the MIB may point to an SS0 configuration for non-reduced capability UEs and to an SS0 configuration for reduced capability UEs.

In some aspects, a non-reduced capability UE may identify the CORESET0 configuration for non-reduced capability UEs by performing a lookup in a CORESET0 configuration table for non-reduced capability UEs. The CORESET0 configuration table may include a plurality of candidate CORESET0 configurations that are indexed by an associated possible value of the CORESET0 field. In these examples, the non-reduced capability UE may perform the lookup by identifying CORESET0 configuration associated with the first value of the CORESET0 field in the CORESET0 configuration table for non-reduced capability UEs. In some aspects, each candidate CORESET0 configuration in the CORESET0 configuration table for non-reduced capability UEs may be associated with a different respective possible value for the CORESET0 field (e.g., a one-to-one mapping).

In some aspects, a reduced capability UE may identify the CORESET0 configuration for reduced capability UEs by performing a lookup in a CORESET0 configuration table for reduced capability UEs. The CORESET0 configuration table may include a plurality of candidate CORESET0 configurations that are indexed by an associated possible value of the CORESET0 field. In these examples, the reduced capability UE may perform the lookup by identifying CORESET0 configuration associated with the first value of the CORESET0 field in the CORESET0 configuration table for reduced capability UEs. In some aspects, each candidate CORESET0 configuration in the CORESET0 configuration table for reduced capability UEs may be associated with a different respective possible value for the CORESET0 field (e.g., a one-to-one mapping). In some aspects, one or more candidate CORESET0 configurations in the CORESET0 configuration table for reduced capability UEs may be associated with a plurality of possible values for the CORESET0 field (e.g., a many-to-one mapping). In some aspects, a many-to-one mapping for candidate CORESET0 configurations in the CORESET0 configuration table for reduced capability UEs may be used in scenarios where the quantity of candidate CORESET0 configurations in the CORESET0 configuration table for non-reduced capability UEs is greater than the quantity of candidate CORESET0 configurations in the CORESET0 configuration table for reduced capability UEs and/or where the n bits in the CORESET0 field are capable of indicating a greater quantity of candidate CORESET0 configurations than the quantity of candidate CORESET0 configurations in the CORESET0 configuration table for reduced capability UEs.

In some aspects, a non-reduced capability UE may identify the SS0 configuration for non-reduced capability UEs by performing a lookup in a SS0 configuration table for non-reduced capability UEs. The SS0 configuration table may include a plurality of candidate SS0 configurations that are indexed by an associated possible value of the SS0 field. In these examples, the non-reduced capability UE may perform the lookup by identifying SS0 configuration associated with the second value of the SS0 field in the SS0 configuration table for non-reduced capability UEs. In some aspects, each candidate SS0 configuration in the SS0 configuration table for non-reduced capability UEs may be associated with a different respective possible value for the SS0 field (e.g., a one-to-one mapping).

In some aspects, a reduced capability UE may identify the SS0 configuration for reduced capability UEs by performing a lookup in an SS0 configuration table for reduced capability UEs. The SS0 configuration table may include a plurality of candidate SS0 configurations that are indexed by an associated possible value of the SS0 field. In these examples, the reduced capability UE may perform the lookup by identifying SS0 configuration associated with the second value of the SS0 field in the SS0 configuration table for reduced capability UEs. In some aspects, each candidate SS0 configuration in the SS0 configuration table for reduced capability UEs may be associated with a different respective possible value for the SS0 field (e.g., a one-to-one mapping). In some aspects, one or more candidate SS0 configurations in the SS0 configuration table for reduced capability UEs may be associated with a plurality of possible values for the SS0 field (e.g., a many-to-one mapping). In some aspects, a many-to-one mapping for candidate SS0 configurations in the SS0 configuration table for reduced capability UEs may be used in scenarios where the quantity of candidate SS0 configurations in the SS0 configuration table for non-reduced capability UEs is greater than the quantity of candidate SS0 configurations in the SS0 configuration table for reduced capability UEs and/or where the n bits in the SS0 field are capable of indicating a greater quantity of candidate SS0 configurations than the quantity of candidate SS0 configurations in the SS0 configuration table for reduced capability UEs.

As further shown in FIG. 3B, CORESET0 configurations for non-reduced capability UEs and CORESET0 configurations for reduced capability UEs may each include one or more CORESET0 parameters. For example, a CORESET0 configuration for non-reduced capability UEs may include an SSB/PBCH and control resource set (CORESET) multiplexing pattern for an associated CORESET0 for non-reduced capability UEs, a quantity of symbols included in the associated CORESET0 for non-reduced capability UEs, a quantity of resource blocks (RBs) included in the associated CORESET0 for non-reduced capability UEs, a resource block offset for the associated CORESET0 for non-reduced capability UEs, and/or the like. Similarly, a CORESET0 configuration for reduced capability UEs may include an SSB/PBCH and CORESET multiplexing pattern for an associated CORESET0 for reduced capability UEs, a quantity of symbols included in the associated CORESET0 for reduced capability UEs, a quantity of RBs included in the associated CORESET0 for reduced capability UEs, a resource block offset for the associated CORESET0 for reduced capability UEs, and/or the like.

In some aspects, a CORESET0 configuration for non-reduced capability UEs and a CORESET0 configuration for reduced capability UEs may have one or more different CORESET0 parameters. For example, a CORESET0 configuration for non-reduced capability UEs and a CORESET0 configuration for reduced capability UEs may have a different SSB/PBCH and CORESET multiplexing pattern, a different quantity of symbols included, a different quantity of RBs, a different resource block offset, and/or the like. In some aspects, a CORESET0 configuration for reduced capability UEs may be configured with a reduced quantity of symbols, resource blocks, and/or the like relative to a CORESET0 configuration for non-reduced capability UEs to account for the reduced frequency bandwidth monitoring and/or processing capability of reduced capability UEs.

As further shown in FIG. 3B, SS0 configurations for non-reduced capability UEs and SS0 configurations for reduced capability UEs may each include one or more SS0 parameters. For example, an SS0 configuration for non-reduced capability UEs may include a time-domain PDCCH monitoring configuration that identifies the PDCCH monitoring occasions (e.g., the time domain resources) that non-reduced capability UEs are to monitor in the CORESET0 and/or the like. Similarly, an SS0 configuration for reduced capability UEs may include a time-domain PDCCH monitoring configuration that identifies the PDCCH monitoring occasions that reduced capability UEs are to monitor in the CORESET0 and/or the like.

In some aspects, an SS0 configuration for non-reduced capability UEs and an SS0 configuration for reduced capability UEs may have one or more different SS0 parameters. For example, an SS0 configuration for non-reduced capability UEs and an SS0 configuration for reduced capability UEs may have different time-domain PDCCH monitoring configuration that identifies the PDCCH monitoring occasions. In some aspects, an SS0 configuration for reduced capability UEs may be configured with a reduced quantity of symbols relative to an SS0 configuration for non-reduced capability UEs.

In this way, a single CORESET0 field of a MIB may point to a plurality of CORESET0 configurations, and a single SS0 field of the MIB may point to a plurality of SS0 configurations. This permits a single CORESET0 field and a single SS0 field to identify different CORESET0 configurations and different SS0 configurations for reduced capability UEs, non-reduced capability UEs, and/or other types of UEs. This conserves radio resources that would have otherwise been consumed on transmitting additional and/or larger SSBs to broadcast or multicast different MIBs for reduced capability UEs and non-reduced capability UEs.

As indicated above, FIGS. 3A and 3B are provided as one or more examples. Other examples may differ from what is described with respect to FIGS. 3A and 3B.

Figure 4:
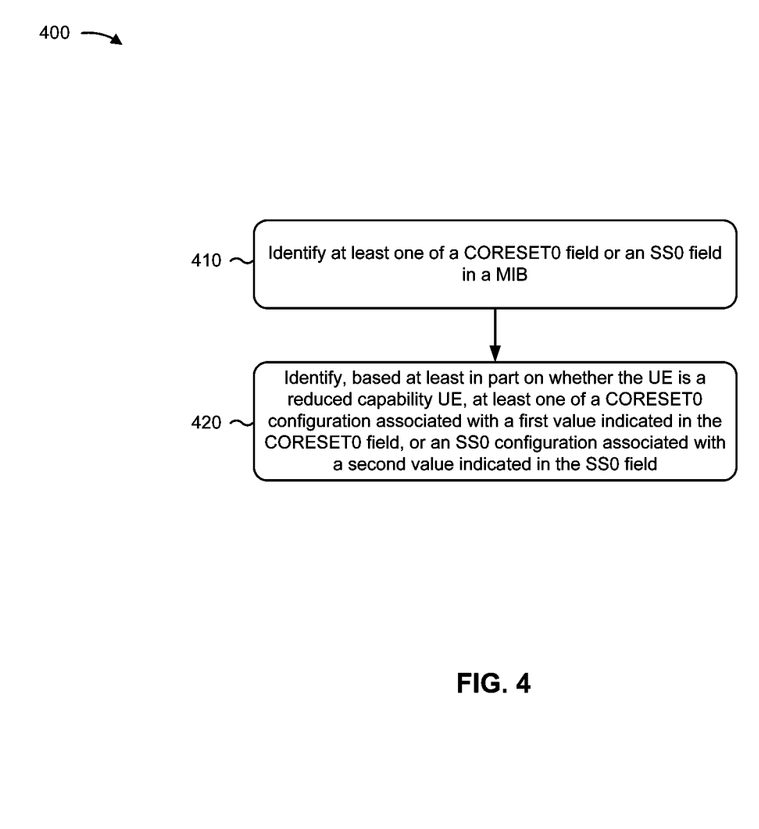
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120 illustrated and described above in connection with FIGS. 1 and 2, the UE illustrated and described above in connection with FIGS. 3A and 3B, and/or the like) performs operations associated with indicating a CORESET0 configuration and/or SS0 configuration for reduced capability UEs.

As shown in FIG. 4, in some aspects, process 400 may include identifying at least one of a CORESET0 field or a SS0 field in a MIB (block 410). For example, the UE (e.g., using receive processor 258, transmit processor 264, controller/processor 280, memory 282, and/or the like) may identify at least one of a CORESET0 field or a SS0 field in a MIB, as described above.

As further shown in FIG. 4, in some aspects, process 400 may include identifying, based at least in part on whether the UE is a reduced capability UE, at least one of a CORESET0 configuration associated with a first value indicated in the CORESET0 field, or an SS0 configuration associated with a second value indicated in the SS0 field (block 420). For example, the UE (e.g., using receive processor 258, transmit processor 264, controller/processor 280, memory 282, and/or the like) may identify, based at least in part on whether the UE is a reduced capability UE, at least one of a CORESET0 configuration associated with a first value indicated in the CORESET0 field or an SS0 configuration associated with a second value indicated in the SS0 field, as described above.

Process 400 may include additional aspects, such as any single aspect or any combination of aspects described below and/or in connection with one or more other processes described elsewhere herein.

In a first aspect, the first value in the CORESET0 field is associated with a first CORESET0 configuration indicated in a first CORESET0 configuration table for non-reduced capability UEs, and the first value in the CORESET0 field is associated with a second CORESET0 configuration indicated in a second CORESET0 configuration table for reduced capability UEs. In a second aspect, alone or in combination with the first aspect, the first CORESET0 configuration and the second CORESET0 configuration include at least one of different synchronization signal block and control resource set multiplexing patterns, different quantities of CORESET0 resource blocks, different quantities of CORESET0 symbols, or different CORESET0 resource block offsets.

In a third aspect, alone or in combination with one or more of the first and second aspects, each CORESET0 configuration indicated in the first CORESET0 configuration table is associated with a different possible value for the CORESET0 field, and each CORESET0 configuration indicated in the second CORESET0 configuration table is associated with a different possible value for the CORESET0 field. In a fourth aspect, alone or in combination with one or more of the first through third aspects, each CORESET0 configuration indicated in the first CORESET0 configuration table is associated with a different possible value for the CORESET0 field, and a CORESET0 configuration indicated in the second CORESET0 configuration table is associated with a plurality of possible values for the CORESET0 field.

In a fifth aspect, alone or in combination with one or more of the first through fourth aspects, the second value in the SS0 field is associated with a first SS0 configuration indicated in a first SS0 configuration table for non-reduced capability UEs, and the second value in the SS0 field is associated with a second SS0 configuration indicated in a second SS0 configuration table for reduced capability UEs. In a sixth aspect, alone or in combination with one or more of the first through fifth aspects, the first SS0 configuration and the second SS0 configuration include different time-domain physical downlink control channel monitoring configurations.

In a seventh aspect, alone or in combination with one or more of the first through sixth aspects, each SS0 configuration indicated in the first SS0 configuration table is associated with a different possible value for the SS0 field, and each SS0 configuration indicated in the second SS0 configuration table is associated with a different possible value for the SS0 field. In an eighth aspect, alone or in combination with one or more of the first through seventh aspects, each SS0 configuration indicated in the first SS0 configuration table is associated with a different possible value for the SS0 field, and an SS0 configuration indicated in the second SS0 configuration table are associated with a plurality of possible values for the SS0 field.

In a ninth aspect, alone or in combination with one or more of the first through eighth aspects, the UE is a reduced capability UE, and identifying at least one of the CORESET0 configuration or the SS0 configuration comprises: identifying at least one of the CORESET0 configuration in a CORESET0 configuration table for reduced capability UEs based at least in part on the first value indicated in the CORESET0 field, or the SS0 configuration in an SS0 configuration table for reduced capability UEs based at least in part on the second value indicated in the SS0 field.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

The following provides an overview of some aspects of the present disclosure:

Aspect 1: A method of wireless communication performed by a user equipment (UE), comprising: identifying at least one of a control resource set zero (CORESET0) field or a search space zero (SS0) field in a master information block (MIB); and identifying, based at least in part on whether the UE is a reduced capability UE, at least one of: a CORESET0 configuration associated with a first value indicated in the CORESET0 field, or an SS0 configuration associated with a second value indicated in the SS0 field.

Aspect 2: The method of aspect 1, wherein the first value in the CORESET0 field is associated with a first CORESET0 configuration indicated in a first CORESET0 configuration table for non-reduced capability UEs; and wherein the first value in the CORESET0 field is associated with a second CORESET0 configuration indicated in a second CORESET0 configuration table for reduced capability UEs.

Aspect 3: The method of aspect 2, wherein the first CORESET0 configuration and the second CORESET0 configuration include at least one of: different synchronization signal block and control resource set multiplexing patterns, different quantities of CORESET0 resource blocks, different quantities of CORESET0 symbols, or different CORESET0 resource block offsets.

Aspect 4: The method of aspect 2 or 3, wherein each CORESET0 configuration indicated in the first CORESET0 configuration table is associated with a different possible value for the CORESET0 field; and wherein each CORESET0 configuration indicated in the second CORESET0 configuration table is associated with a different possible value for the CORESET0 field. Aspect 5: The method of aspect 2 or 3, wherein each CORESET0 configuration indicated in the first CORESET0 configuration table is associated with a different possible value for the CORESET0 field; and wherein a CORESET0 configuration indicated in the second CORESET0 configuration table is associated with a plurality of possible values for the CORESET0 field.

Aspect 6: The method of any of aspects 1-6, wherein the second value in the SS0 field is associated with a first SS0 configuration indicated in a first SS0 configuration table for non-reduced capability UEs; and wherein the second value in the SS0 field is associated with a second SS0 configuration indicated in a second SS0 configuration table for reduced capability UEs. Aspect 7: The method of aspect 6, wherein the first SS0 configuration and the second SS0 configuration include different time-domain physical downlink control channel monitoring configurations.

Aspect 8: The method of aspect 6 or 7, wherein each SS0 configuration indicated in the first SS0 configuration table is associated with a different possible value for the SS0 field; and wherein each SS0 configuration indicated in the second SS0 configuration table is associated with a different possible value for the SS0 field. Aspect 9: The method of aspect 6 or 7, wherein each SS0 configuration indicated in the first SS0 configuration table is associated with a different possible value for the SS0 field; and wherein an SS0 configuration indicated in the second SS0 configuration table are associated with a plurality of possible values for the SS0 field.

Aspect 10: The method of any of aspects 1-9, wherein the UE is a reduced capability UE; and wherein identifying at least one of the CORESET0 configuration or the SS0 configuration comprises: identifying at least one of: the CORESET0 configuration in a CORESET0 configuration table for reduced capability UEs based at least in part on the first value indicated in the CORESET0 field, or the SS0 configuration in an SS0 configuration table for reduced capability UEs based at least in part on the second value indicated in the SS0 field.

Aspect 11: An apparatus for wireless communication at a device, comprising a processor; memory coupled with the processor; and instructions stored in the memory and executable by the processor to cause the apparatus to perform the method of one or more aspects of aspects 1-10. Aspect 12: A device for wireless communication, comprising a memory and one or more processors coupled to the memory, the memory and the one or more processors configured to perform the method of one or more aspects of aspects 1-10.

Aspect 13: An apparatus for wireless communication, comprising at least one means for performing the method of one or more aspects of aspects 1-10. Aspect 14: A non-transitory computer-readable medium storing code for wireless communication, the code comprising instructions executable by a processor to perform the method of one or more aspects of aspects 1-10. Aspect 15: A non-transitory computer-readable medium storing a set of instructions for wireless communication, the set of instructions comprising one or more instructions that, when executed by one or more processors of a device, cause the device to perform the method of one or more aspects of aspects 1-10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software.

The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   identifying at least one of a control resource set zero (CORESET0) field or a search space zero (SS0) field in a master information block (MIB); and
   identifying, based at least in part on whether the UE is a reduced capability UE, at least one of:
      a CORESET0 configuration associated with a first value indicated in the CORESET0 field, wherein the first value in the CORESET0 field is associated with a first CORESET0 configuration indicated in a first CORESET0 configuration table for non-reduced capability UEs and a second CORESET0 configuration indicated in a second CORESET0 configuration table for reduced capability UEs, or
      an SS0 configuration associated with a second value indicated in the SS0 field.

2. The method of claim 1, wherein the first CORESET0 configuration and the second CORESET0 configuration include at least one of:
   different synchronization signal block and control resource set multiplexing patterns,
   different quantities of CORESET0 resource blocks,
   different quantities of CORESET0 symbols, or
   different CORESET0 resource block offsets.

3. The method of claim 1, wherein each CORESET0 configuration indicated in the first CORESET0 configuration table is associated with a different possible value for the CORESET0 field; and
   wherein each CORESET0 configuration indicated in the second CORESET0 configuration table is associated with a different possible value for the CORESET0 field.

4. The method of claim 1, wherein each CORESET0 configuration indicated in the first CORESET0 configuration table is associated with a different possible value for the CORESET0 field; and
   wherein a CORESET0 configuration indicated in the second CORESET0 configuration table is associated with a plurality of possible values for the CORESET0 field.

5. The method of claim 1, wherein the second value in the SS0 field is associated with a first SS0 configuration indicated in a first SS0 configuration table for non-reduced capability UEs; and
   wherein the second value in the SS0 field is associated with a second SS0 configuration indicated in a second SS0 configuration table for reduced capability UEs.

6. The method of claim 5, wherein the first SS0 configuration and the second SS0 configuration include different time-domain physical downlink control channel monitoring configurations.

7. The method of claim 5, wherein each SS0 configuration indicated in the first SS0 configuration table is associated with a different possible value for the SS0 field; and
   wherein each SS0 configuration indicated in the second SS0 configuration table is associated with a different possible value for the SS0 field.

8. The method of claim 5, wherein each SS0 configuration indicated in the first SS0 configuration table is associated with a different possible value for the SS0 field; and
   wherein an SS0 configuration indicated in the second SS0 configuration table are associated with a plurality of possible values for the SS0 field.

9. The method of claim 1, wherein the UE is a reduced capability UE; and
   wherein identifying at least one of the CORESET0 configuration or the SS0 configuration comprises:
      identifying at least one of:
         the CORESET0 configuration in a CORESET0 configuration table for reduced capability UEs based at least in part on the first value indicated in the CORESET0 field, or
         the SS0 configuration in an SS0 configuration table for reduced capability UEs based at least in part on the second value indicated in the SS0 field.

10. A user equipment (UE) for wireless communication, comprising:
    a memory; and
    one or more processors coupled to the memory, the one or more processors configured to:
       identify at least one of a control resource set zero (CORESET0) field or a search space zero (SS0) field in a master information block (MIB); and
       identify, based at least in part on whether the UE is a reduced capability UE, at least one of:
          a CORESET0 configuration associated with a first value indicated in the CORESET0 field, wherein the first value in the CORESET0 field is associated with a first CORESET0 configuration indicated in a first CORESET0 configuration table for non-reduced capability UEs and a second CORE- SET0 configuration indicated in a second CORESET0 configuration table for reduced capability UEs, or
an SS0 configuration associated with a second value indicated in the SS0 field.

11. The UE of claim 10, wherein the first CORESET0 configuration and the second CORESET0 configuration include at least one of:
different synchronization signal block and control resource set multiplexing patterns,
different quantities of CORESET0 resource blocks,
different quantities of CORESET0 symbols, or
different CORESET0 resource block offsets.

12. The UE of claim 10, wherein each CORESET0 configuration indicated in the first CORESET0 configuration table is associated with a different possible value for the CORESET0 field; and
wherein each CORESET0 configuration indicated in the second CORESET0 configuration table is associated with a different possible value for the CORESET0 field.

13. The UE of claim 10, wherein each CORESET0 configuration indicated in the first CORESET0 configuration table is associated with a different possible value for the CORESET0 field; and
wherein a CORESET0 configuration indicated in the second CORESET0 configuration table is associated with a plurality of possible values for the CORESET0 field.

14. The UE of claim 10, wherein the second value in the SS0 field is associated with a first SS0 configuration indicated in a first SS0 configuration table for non-reduced capability UEs; and
wherein the second value in the SS0 field is associated with a second SS0 configuration indicated in a second SS0 configuration table for reduced capability UEs.

15. The UE of claim 14, wherein the first SS0 configuration and the second SS0 configuration include different time-domain physical downlink control channel monitoring configurations.

16. The UE of claim 14, wherein each SS0 configuration indicated in the first SS0 configuration table is associated with a different possible value for the SS0 field; and
wherein each SS0 configuration indicated in the second SS0 configuration table is associated with a different possible value for the SS0 field.

17. The UE of claim 14, wherein each SS0 configuration indicated in the first SS0 configuration table is associated with a different possible value for the SS0 field; and
wherein an SS0 configuration indicated in the second SS0 configuration table are associated with a plurality of possible values for the SS0 field.

18. The UE of claim 10, wherein the UE is a reduced capability UE; and
wherein the one or more processors, when identifying at least one of the CORESET0 configuration or the SS0 configuration, are configured to:
identify at least one of:
the CORESET0 configuration in a CORESET0 configuration table for reduced capability UEs based at least in part on the first value indicated in the CORESET0 field, or
the SS0 configuration in an SS0 configuration table for reduced capability UEs based at least in part on the second value indicated in the SS0 field.

19. A non-transitory computer-readable medium storing a set of instructions for wireless communication, the set of instructions comprising:
one or more instructions that, when executed by one or more processors of a user equipment (UE), cause the UE to:
identify at least one of a control resource set zero (CORESET0) field or a search space zero (SS0) field in a master information block (MIB); and
identify, based at least in part on whether the UE is a reduced capability UE, at least one of:
a CORESET0 configuration associated with a first value indicated in the CORESET0 field, wherein the first value in the CORESET0 field is associated with a first CORESET0 configuration indicated in a first CORESET0 configuration table for non-reduced capability UEs and a second CORESET0 configuration indicated in a second CORESET0 configuration table for reduced capability UEs, or
an SS0 configuration associated with a second value indicated in the SS0 field.

20. The non-transitory computer-readable medium of claim 19, wherein the first CORESET0 configuration and the second CORESET0 configuration include at least one of:
different synchronization signal block and control resource set multiplexing patterns,
different quantities of CORESET0 resource blocks,
different quantities of CORESET0 symbols, or
different CORESET0 resource block offsets.

21. The non-transitory computer-readable medium of claim 19, wherein each CORESET0 configuration indicated in the first CORESET0 configuration table is associated with a different possible value for the CORESET0 field; and
wherein each CORESET0 configuration indicated in the second CORESET0 configuration table is associated with a different possible value for the CORESET0 field.

22. The non-transitory computer-readable medium of claim 19, wherein each CORESET0 configuration indicated in the first CORESET0 configuration table is associated with a different possible value for the CORESET0 field; and
wherein a CORESET0 configuration indicated in the second CORESET0 configuration table is associated with a plurality of possible values for the CORESET0 field.

23. The non-transitory computer-readable medium of claim 19, wherein the second value in the SS0 field is associated with a first SS0 configuration indicated in a first SS0 configuration table for non-reduced capability UEs; and
wherein the second value in the SS0 field is associated with a second SS0 configuration indicated in a second SS0 configuration table for reduced capability UEs.

24. An apparatus for wireless communication, comprising:
means for identifying at least one of a control resource set zero (CORESET0) field or a search space zero (SS0) field in a master information block (MIB); and
means for identifying, based at least in part on whether the apparatus is a reduced capability UE, at least one of:
a CORESET0 configuration associated with a first value indicated in the CORESET0 field, wherein the first value in the CORESET0 field is associated with a first CORESET0 configuration indicated in a first CORESET0 configuration table for non-reduced capability UEs and a second CORESET0 configuration indicated in a second CORESET0 configuration table for reduced capability UEs, or
an SS0 configuration associated with a second value indicated in the SS0 field.

25. The apparatus of claim 24, wherein the second value in the SS0 field is associated with a first SS0 configuration indicated in a first SS0 configuration table for non-reduced capability UEs; and wherein the second value in the SS0 field is associated with a second SS0 configuration indicated in a second SS0 configuration table for reduced capability UEs.

26. The apparatus of claim 25, wherein the first SS0 configuration and the second SS0 configuration include different time-domain physical downlink control channel monitoring configurations.

27. The apparatus of claim 25, wherein each SS0 configuration indicated in the first SS0 configuration table is associated with a different possible value for the SS0 field; and wherein each SS0 configuration indicated in the second SS0 configuration table is associated with a different possible value for the SS0 field.

28. The apparatus of claim 24, wherein the first SS0 configuration and the second SS0 configuration include different time-domain physical downlink control channel monitoring configurations.

29. The apparatus of claim 24, wherein each SS0 configuration indicated in the first SS0 configuration table is associated with a different possible value for the SS0 field; and wherein each SS0 configuration indicated in the second SS0 configuration table is associated with a different possible value for the SS0 field.

30. The apparatus of claim 24, wherein each SS0 configuration indicated in the first SS0 configuration table is associated with a different possible value for the SS0 field; and wherein an SS0 configuration indicated in the second SS0 configuration table are associated with a plurality of possible values for the SS0 field.

* * * * *